July 15, 1947.  R. A. COFFMAN  2,423,963
APPARATUS FOR COOKING MEATS AND THE LIKE
Filed June 1, 1943  3 Sheets-Sheet 1
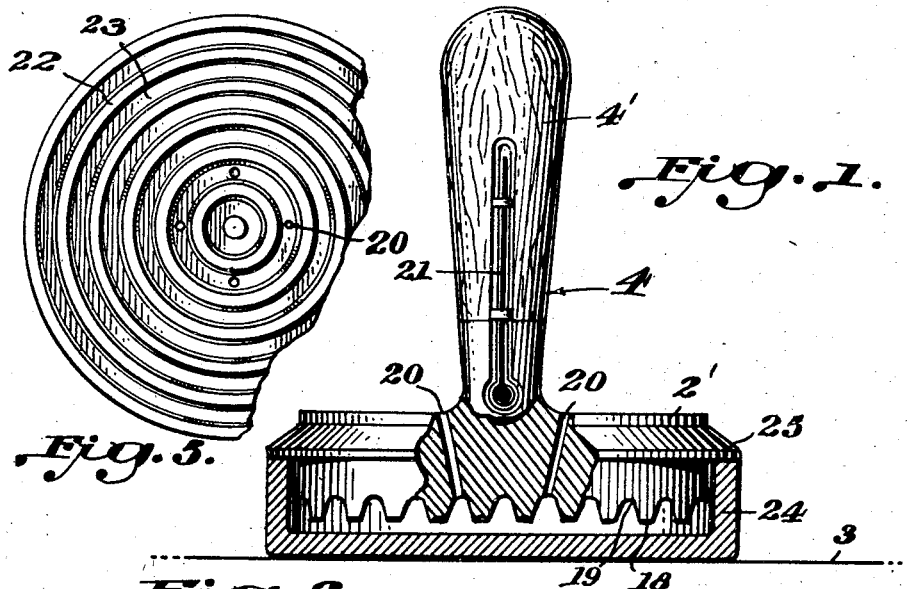
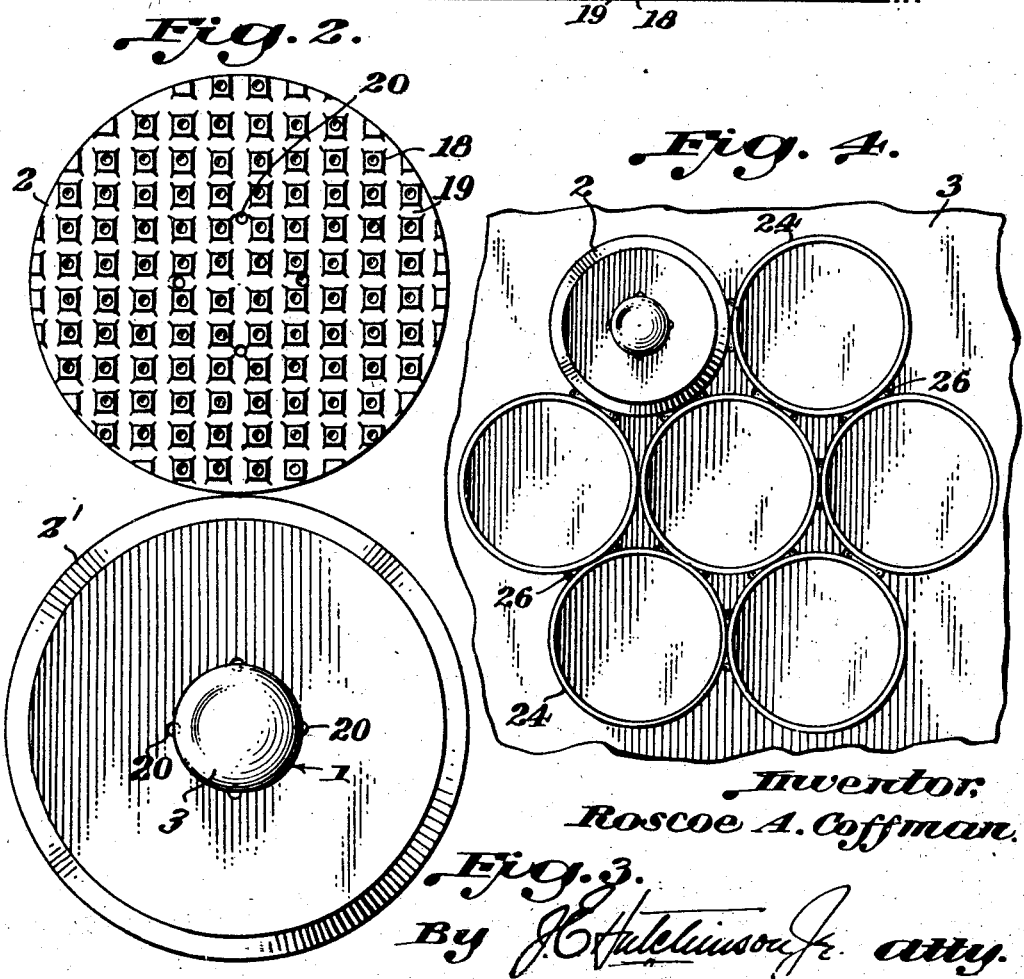
Inventor,
Roscoe A. Coffman.
By J. C. Hutchinson Jr. atty.

July 15, 1947.　　　　R. A. COFFMAN　　　　2,423,963
APPARATUS FOR COOKING MEATS AND THE LIKE
Filed June 1, 1943　　　　3 Sheets-Sheet 2
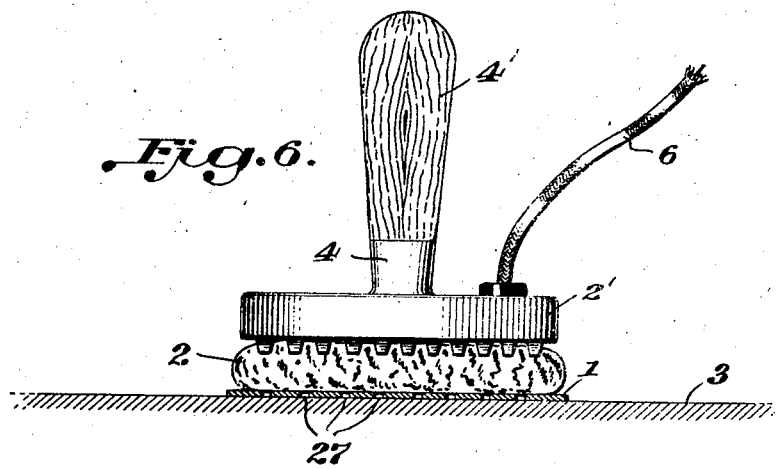
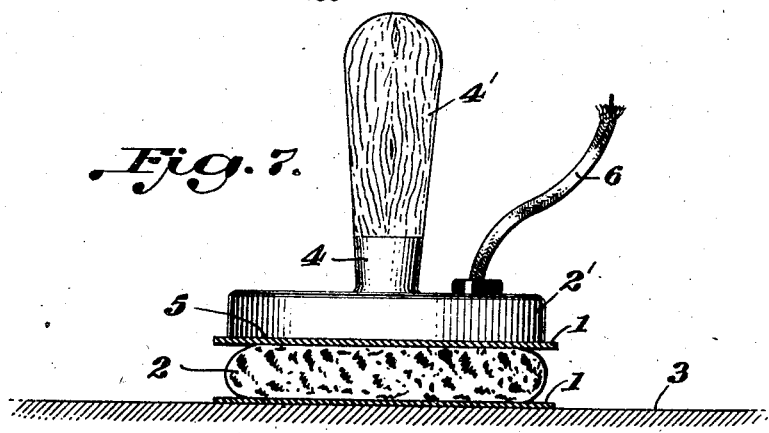
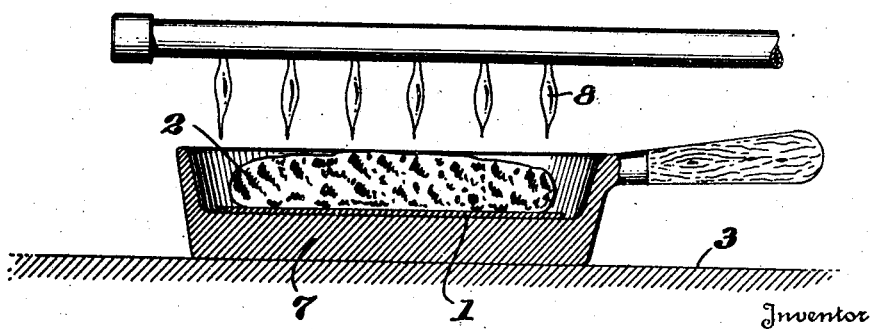
Inventor
Roscoe A. Coffman,
By J. R. Hutchinson Jr.
Attorney July 15, 1947.   R. A. COFFMAN   2,423,963
APPARATUS FOR COOKING MEATS AND THE LIKE
Filed June 1, 1943   3 Sheets-Sheet 3

Inventor
Roscoe A. Coffman,
Attorney

Patented July 15, 1947

2,423,963

UNITED STATES PATENT OFFICE 2,423,963

APPARATUS FOR COOKING MEATS AND THE LIKE

Roscoe A. Coffman, Las Vegas, Nev.

Application June 1, 1943, Serial No. 489,303

6 Claims. (Cl. 99—349)

This invention relates to a process for cooking meats and the like, and to cooking utensils and implements used in carrying out said process.

My invention provides for the cooking of meats or other foods upon or in contact with a thin veneer sheet of wood or like material receiving heat from a heated surface, which during the cooking of the meat imparts thereto the peculiarly delicate flavor of wood or other materials after what is commonly known as the "planking" process.

In the carrying out of my improved process, it is a very important object of the invention to provide for the use of thin veneer sheets of wood or like material, which are of such character and of relatively reduced size in so far as thickness and quantity of material are concerned, as to warrant being discarded or thrown away after a single use in the process of "planking" a steak or other food.

A further object of the invention resides in providing for the cooking of the meat between thin veneer sheets, the meat being supported upon one sheet with a second sheet arranged in contact with the upper surface of the meat being cooked, and a heated surface associated with each one of said veneer sheets, so that the heat is transferred to the meat through said veneer sheets.

Another object is to cook meat or other foods by applying the heat thereto through a thin veneer sheet of wood or like material, and thus impart to said meat the desired delicate flavor.

A still further object of the invention is to provide, either for use alone in the cooking, frying or broiling of meat, such as hamburgers, or in conjunction with the use of these thin veneer sheets, an implement of required weight and of adequate volume to retain sufficient amount of heat for cooking purposes, said implement having a meat engaging surface for holding the meat in contact with a heated surface during the cooking thereof, and constituting the sole means for preventing the meat from shrinking in all directions during the cooking operation, and whereby the meat may be cooked from both sides at the same time.

Also, it is the object of this invention to provide an implement for cooking meat and the like, which implement has the capacity of retaining heat for an appreciable period of time after being preheated, in combination with means to be associated therewith for preheating the base of said implement and its meat engaging surface, and whereby said base and the meat engaging surface are maintained in a heated condition, prior to use for cooking purposes, by being submerged in a heated fluid maintained at the proper temperature for such purposes.

With the above and other objects in view, the invention consists of the combinations as set forth in the claims, and all equivalents thereof.

In the accompanying drawings in which the same reference characters indicate the same parts in all of the views:

Fig. 1 is a side elevation, partly in section, of an improved implement used in practicing my improved process, the implement being shown as supported within a receptacle containing heating fluid.

Fig. 2 is a bottom plan view of the meat engaging surface of the implement shown in Fig. 1.

Fig. 3 is a top plan view of the implement shown in Fig. 1.

Fig. 4 is a top plan view of a series of heating fluid receptacles connected as a unit, and for use in connection with implements of the type shown in Fig. 1.

Fig. 5 is a bottom plan view of a modified design for the meat engaging surface of an implement of the type shown in Fig. 1.

Fig. 6 is a side elevation of a modified form of cooking implement, electrically heated, and shown in contact with the meat being cooked, and with the meat supported upon a thin veneer sheet in contact with a heated surface.

Fig. 7 is a side elevation of a still modified form of electric cooking implement.

Fig. 8 is a sectional view of a platter used in practicing my improved process under a broiling flame.

Figure 9:
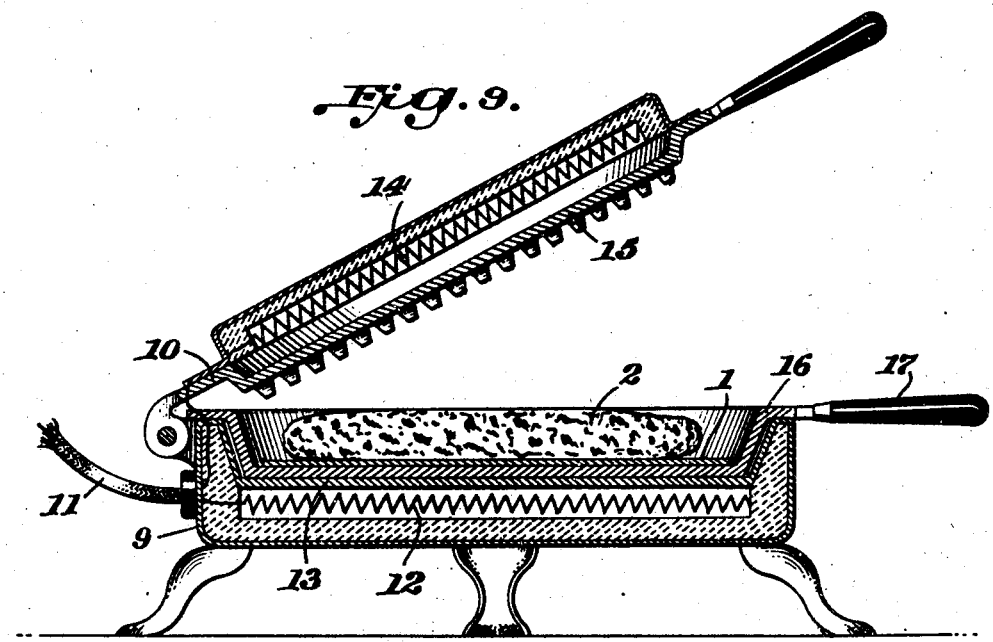
Fig. 9 is a cross sectional view of an electric broiler for use in practicing said improved process.

Referring now more particularly to the accompanying drawings, it will appear that the improved process deals with the cooking, frying or broiling of meats and other foods, and in which the meat is in direct contact with a thin veneer sheet 1 of wood or like material which in turn receives heat from a heated surface, whereby the heat for cooking said meat is applied through these veneer sheets and imparts to the meat the delicate flavor received from the wood.

This process may be practiced in a number of different ways and by the use of various types of implements and utensils, and furthermore, with the thin veneer sheets applied to either the upper or the lower surface of the meat, or both surfaces thereof.

For instance, as shown in Fig. 6, the meat, indicated at 2 is supported on a thin veener sheet 1, which in turn is supported upon and in direct contact with a smooth heated surface, such as a smooth top stove or griddle 3. In this connection, the meat or other food is cooked from below through the thin veener sheet 1, and in order at the same time to cook said meat from above, a heated implement, generally indicated at 4, is provided, which implement, as shown in Fig. 6, is in direct contact with the upper surface of said meat, and is so constructed upon its meat engaging surface, as to constitute the sole means for preventing said meat from shrinking in all directions during the cooking thereof. The design of this meat engaging surface will be described in detail further on in this specification.

The planking process may also be carried out by applying the thin veneer sheets simultaneously to both the upper and lower surfaces of the meat, as shown for instance in Fig. 7 of the drawings. In this instance, the meat indicated at 2 is supported upon and in direct contact with a thin veneer sheet 1 which in turn is supported upon and in direct contact with a heated surface, so that said meat may be cooked from below through the veneer sheet as in Fig. 6. However, in this particular instance, a thin veneer sheet 1 is applied to the upper surface of the meat, and a heated implement of the type shown in Fig. 7 used to directly contact said veneer sheet so as to cook the meat also from above and through said veneer sheet. In this particular instance, the implement is provided with a smooth contacting surface as indicated at 5, which as stated above is in direct contact with the veneer sheet.

The implements shown in Figs. 6 and 7 are shown as electrically heated, the electric conducting cord being indicated at 6, but it will be understood that said implements may be otherwise heated in a manner to be hereinafter set forth. When electrically heated, if desired, a two or three point heat control means may be provided, as will be obvious.

Referring now particularly to Fig. 8, it will be noted that the planking process may be carried out by the use of a platter or other utensil 7 of cast iron, aluminum, or other metal or suitable material, which may be heated by placing the same upon a smooth top stove or griddle 3, or in fact heated or preheated in any other manner. In this particular instance, the thin veneer sheet 1 is placed in direct contact with the cooking surface of the platter and the meat or other food 2 supported upon and in direct contact with said veneer sheet, whereby said meat may be cooked from below through the veneer sheet. This platter, as will be obvious, has sufficient volume of material to hold and retain the proper amount of heat to do the cooking through the veneer sheet placed in the platter and on which the meat is placed, and in this connection, and after the meat is cooked, said platter, due to its heat retaining capacity, will serve to keep the food hot when brought to the table in said platter, and as a matter of fact, the meat will still be cooking upon said platter until served. As shown in Fig. 8, the platter 7 may be placed under a gas flame, as indicated at 8, and this so that the meat or other food contained within the platter will be broiled under a broiler flame from above, and at the same time said meat is being cooked from below and through the veneer sheet.

Figure 10:
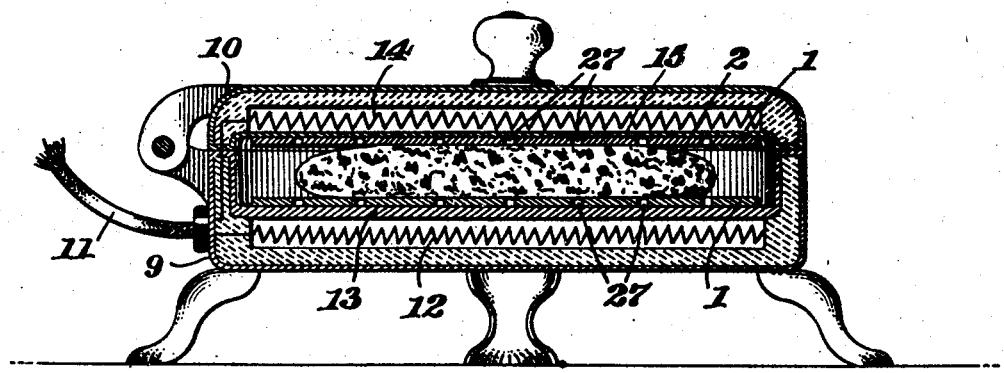
Fig. 10 is a cross sectional view of a modified form of electric broiler to be used in practicing this invention.

Other types of utensils may be used for carrying out the process disclosed herein, such for instance as those illustrated in Figs. 9 and 10 of the drawings. In Fig. 9 is shown an electric broiler of the portable type and having a main body 9 and a hinged cover 10. An electric cord 11 is adapted for connection with any source of electrical energy and connects inside of the broiler with an electrical heating resistance wire 12 underneath the heating plate 13 of the body 9, and also with a similar resistance wire 14 within the cover 10. These elements 12 and 14 are connected together and are suitably installed and insulated in any manner well known in the art, hence I am not particularly describing the same in this application. A heating plate 15 forms the bottom side of the cover or lid 10 and extends substantially parallel with the heating plate 13 when the cover 10 is closed. The under surface of this heating plate 15 is constructed in a manner to be hereinafter described, it being sufficient at this point to state that said heating surface is so designed as to contact the meat or other food during the cooking operation, and adapted to serve as the sole means for preventing said meat from shrinking in all directions while being cooked.

In the use of this electric broiler as disclosed in Fig. 9, a platter 16 having a heat insulated handle 17 is usually placed within the broiler with its under surface in direct contact with the heating plate 13, and with the handle 17 in a position outside the broiler. This platter is to receive the meat or other food to be cooked, and in this connection the meat is placed within the platter with a thin veneer sheet 1 interposed between the meat and the upper surface of the bottom of said platter. The cover 10 of the broiler is then closed, whereupon the under surface of the heating plate 15 of said cover maintains a position in direct contact with the meat to be cooked or broiled. Under these conditions and with the heated surfaces of the broiler at the proper temperature, the meat or other food will be cooked from above while in contact with the heating plate 15 and at the same time cooked from below through the veneer sheet 1, which sheet receives heat from the bottom of the platter which in turn receives heat from the heating plate 13. Of course if desired, the platter 16 could be dispensed with and the thin veneer sheet placed directly upon the heating plate 13, with the meat resting thereon, and the upper surface of said meat in direct contact with the heating plate 15. In this Fig. 9 construction, the heating plate 15 with its specially designed meat contacting surface, serves alone to prevent the meat from shrinking in all directions while being cooked.

In the construction shown in Fig. 10, the electric broiler is quite similar in certain respects to the broiler illustrated in Fig. 9, like parts being represented by the same reference numerals. However, in the Fig. 10 construction, the platter 16 is dispensed with and a thin veneer sheet 1 is placed directly upon the heating plate 13, with the meat resting upon said veneer sheet, and with a second veneer sheet 1 placed in direct contact with the upper surface of the meat being cooked, which second veneer sheet directly contacts the heating plate 15 of the cover or lid 10 when said cover is in closed position. In this particular condition the meat is cooked from above and below, and as will be obvious through the veneer sheets in both instances, the meat thus being sandwiched between said veneer sheets as clearly shown. It will also be noted that in this particular instance the meat engaging surface of the plate 15 is smooth.

Now referring particularly to the type of meat engaging surface for cooking meat and the like and at the same time constituting the sole means for preventing the meat from shrinking in all directions during cooking, it is to be borne in mind that this type of surface may be formed on the underside of the lid or cover of an electric or other type of broiler, as shown for instance in Fig. 9, or else formed on the underside of an implement of the types shown in Figs. 1 and 6.

As to the design of this meat engaging surface, it will be obvious that said surface may be formed in any particular manner so long as it is capable of contacting the meat and hold the same, while cooking, from shrinking in all directions. For instance, this contacting surface may take the form disclosed in Figs. 1 and 2 of the drawings, and then again it might assume the form as shown in Fig. 5.

In the form of the invention as disclosed in Figs. 1 and 2, the meat engaging surface is formed upon the underside of an implement of metal or other suitable material having the proper weight, density, thickness, size and heat holding capacity to fry meat, such as hamburger, from above while said meat is frying from below upon the smooth cooking surface of a suitable griddle. This implement is generally indicated at 4 and has a handle 4' and a heat retaining base 2' upon the under side of which base is formed the meat engaging surface just mentioned. This meat engaging surface in this particular instance comprises a plurality of projections or teats 18 spaced apart and so arranged with respect to each other that when they are embedded in the meat, serve to prevent the meat from shrinking in all directions. One arrangement of said projections is as disclosed particularly in Fig. 2. The entire surfaces of the projections 18 and the surfaces 19 between said projections, constitute a maximum meat engaging surface which will effectively function in the manner as described herein. In the face of this implement is provided a series of vent openings 20 which, in the showing of Fig. 1, are vertically arranged and extend through the base, so as to vent steam or other moisture during the cooking operation. Furthermore, the handle 4' is provided with a thermometer 21 for obvious purposes.

Referring now to the form of the meat engaging surface shown in Fig. 5, it will be noted that a series of concentric circular ridges 22 are provided, which circular ridges are of such construction as to be capable of being embedded in the upper surface of the meat being cooked when the implement provided with such meat engaging surface is applied to the upper surface of said meat, and thus constituting the sole means for preventing the meat from shrinking in all directions during cooking. These circular ridges 22 and the metal forming the grooves 23 between the concentric ridges, also constitute a maximum meat engaging surface which will provide for the proper cooking of said meat.

While it is true that the cooking implement herein referred to may be heated electrically or, in fact, in any preferred manner, it is also proposed by this invention to preheat said implement and its meat engaging surface in a manner which will now be described. In Fig. 1 of the drawings is illustrated an implement of the type heretofore described, which implement may be preheated and maintained in its heated condition, for use as a cooking means, by submerging the base thereof in a hot fluid, such for instance as molten lead, Babbitt metal, Wood's metal, hot mercury, and the like, or in oil or frying fat which is kept heated. It is well to note at this point that the frying fat or oil which is used for heating purposes will also keep the implement greased ready for use and prevent it from sticking to the meat, and furthermore will also keep the implement from rusting. This hot fluid is contained within a dish-like receptacle 24, and the implement 1 may be supported upon the upper rim of said receptacle by the peripheral flange 25 formed on the base 2' of said implement and with the lower part of said base, including the meat engaging surface, submerged in the hot fluid. It will of course be understood that the implement 4 is so supported upon the receptacle that the lower portion of the base is submerged in the hot fluid and with its meat engaging surface spaced from the bottom of the receptacle, as clearly shown in Fig. 1, or in other words not in contact with said receptacle bottom. Contact between the implement and the heated receptacle is however maintained through the flange 25 and the rim of said receptacle 24, whereby proper transfer of heat from the heated receptacle to the implement is provided. Furthermore, it will be noted that the receptacle and its contents, namely, the hot fluid therein, is maintained in a proper heated condition by placing the receptacle upon a smooth hot plate stove 3, the receptacle being in direct contact with said hot plate. Of course, it will be readily understood that said receptacle and its contents may be maintained in a hot condition by any other preferred means. At this point, attention is also called to the fact that a series of these receptacles may be provided and arranged upon the hot plate stove in the manner as clearly illustrated in Fig. 4. This series of receptacles may if desired be arranged as shown in Fig. 4 and connected as a unit by welding the same together as shown at 26.

The cooking implement described herein, is particularly useful and adapted for the cooking or frying of hamburgers and the like, which hamburgers are usually fried from below upon a smooth cooking surface, and this for the reason that said implement not only cooks the hamburger from above while it is frying from below on the smooth cooking surface, but also constitutes the sole means for preventing the hamburger from shrinking in all directions during cooking. The hamburger after being cooked in the manner just set forth, may then be readily lifted from the smooth cooking surface with a spatula or other implement, such as a pancake turner or the like.

Furthermore, it is to be understood that the veneer sheets 1 may, if desired, be perforated as at 27, and this for the purpose of affording greater transfer of heat through the veneer sheets to the meat being cooked.

And also the veneer sheets may be made of wood, such as oak, hickory, or any other wood, material or substance, which will give to the meat the peculiarly delicate flavor desired, as described herein.

From the foregoing description, it will be readily seen that I have provided an improved process which will bring about the results desired, and furthermore produce implements for carrying out such process as substantially fulfill the objects of the invention as set forth herein.

While this specification sets forth in detail the present and preferred construction of implements for carrying out the improved process, still in practice such deviations from such details may be resorted to as do not form a departure from the spirit of the invention, as defined by the appended claims.

Having thus described my invention, what I claim as new and useful and desire to secure by Letters Patent is:

1. A cooking device comprising means for applying cooking heat to one side of food while said food is in direct surface contact with a thin veneer sheet of wood of a break-down nature when subjected to cooking heat passed directly through the sheet during a normal cooking operation, in combination with a heated cooking surface in direct contact with said sheet of wood, said sheet being thin enough and the heat from said heated cooking surface being of such intensity as to permit passage of cooking heat directly through said sheet during a normal cooking operation, and to thereby break down such sheet to such an extent as to generate heated gases of distillation for passage through said sheet directly to the food for further cooking and flavoring said food.

2. A cooking device comprising means for applying cooking heat to the upper surface of food for cooking the same from above while said food is supported upon and in direct surface contact with a thin veneer sheet of wood of a break-down nature when subjected to cooking heat passed directly through the sheet during a normal cooking operation, in combination with a heated cooking surface in direct contact with the underside of said sheet of wood, said sheet being thin enough and the heat from said heated cooking surface being of such intensity as to permit passage of cooking heat through said sheet during a normal cooking operation to thereby break down the sheet to such an extent as to generate heated gases of distillation for passage through said sheet directly to the food for cooking and flavoring said food from below.

3. A cooking device comprising means for applying cooking heat to the upper surface of food for cooking the same from above and while said food is supported upon and in direct surface contact with a thin veneer sheet of flavoring substance independent of the food and of a break-down nature when subjected to cooking heat passed directly through the sheet during a normal cooking operation, in combination with a heated cooking surface in direct contact with the underside of the sheet, said sheet being of such character and the heat from said heated cooking surface being of such intensity as to permit passage of cooking heat through said sheet during a normal cooking operation, to thereby break down the sheet to such an extent as to generate flavoring gases for passage through said sheet directly to the food for cooking and flavoring said food from below.

4. A cooking device for cooking meat, comprising an implement having a heated meat engaging surface for holding said meat in direct surface contact with a thin veneer sheet of wood and also in non-shrinking relation thereto while said heated surface is cooking said meat from one side thereof, in combination with a heated cooking surface in direct contact with the sheet, said sheet being thin enough and the heat from said last mentioned heated surface being of such intensity as to permit passage of cooking heat through said sheet during a normal cooking operation to thereby break down the sheet in generating heated gases of distillation for transference from the sheet directly to the meat for cooking and flavoring said meat from the other side thereof, and with the heated meat engaging surface of said implement constituting the sole means for preventing the meat from shrinking in all directions during said cooking operation.

5. A cooking device for planking meat or the like, comprising two thin veneer sheets of flavoring substance in direct surface contact with the meat situated therebetween during the cooking operation, and a heated cooking surface in direct contact with each veneer sheet, the two thin veneer sheets being thin enough and the heat from said heated cooking surfaces being of such intensity as to permit passage of cooking heat through said sheets during a normal cooking operation to thereby break down such sheets to such an extent as to generate flavoring gases for cooking and flavoring said meat from both sides thereof.

6. A cooking device comprising means for applying cooking heat to one side of food while said food is in direct surface contact with a perforated thin veneer sheet of wood of a break-down nature when subjected to cooking heat passed directly through the sheet during a normal cooking operation in combination with a heated cooking surface in direct contact with said sheet of wood, said sheet being thin enough and the heat from said heated cooking surface being of such intensity as to permit passage of cooking heat directly through said sheet during a normal cooking operation to thereby break down such sheet to such an extent as to generate heated gases of distillation for passage through said sheet directly to the food for further cooking and flavoring said food.

ROSCOE A. COFFMAN.

REFERENCES CITED

The following references are of record in the file of this patent:

UNITED STATES PATENTS

| Number | Name | Date |
| --- | --- | --- |
| 764,496 | Overton | July 5, 1904 |
| 58,460 | Reed | Oct. 2, 1866 |
| 267,535 | Hurd | Nov. 14, 1882 |
| 2,225,176 | Lewis | Dec. 17, 1940 |
| 2,310,690 | Griffith | Feb. 9, 1943 |
| 1,915,962 | Vaughn | June 27, 1933 |
| 2,070,850 | Trabold | Feb. 16, 1937 |
| 1,906,999 | Parker | May 2, 1933 |
| 2,191,275 | Fink | Feb. 20, 1940 |
| 1,190,010 | Ruebold | July 4, 1916 |
| 663,483 | Betts | Dec. 11, 1900 |
| 2,086,155 | Castner | July 6, 1937 |
| 2,241,317 | Pringle | May 6, 1941 |
| 1,790,194 | Amacher | Jan. 24, 1931 |
| 1,300,504 | Speaks | Apr. 15, 1919 |

FOREIGN PATENTS

| Number | Country | Date |
| --- | --- | --- |
| 400,545 | France | June 11, 1909 |
| 756,826 | France | 1933 |